United States Patent
Seo et al.

(10) Patent No.: US 7,961,570 B2
(45) Date of Patent: Jun. 14, 2011

(54) RECORDING MEDIUM HAVING DATA STRUCTURE FOR MANAGING REPRODUCTION OF MULTIPLE AUDIO STREAMS RECORDED THEREON AND RECORDING AND REPRODUCING METHODS AND APPARATUSES

(75) Inventors: Kang Soo Seo, Kyunggi-do (KR);
Byung Jin Kim, Kyunggi-do (KR);
Soung Hyun Um, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/859,164

(22) Filed: Aug. 18, 2010

(65) Prior Publication Data
US 2010/0309760 A1  Dec. 9, 2010

Related U.S. Application Data

(62) Division of application No. 10/682,886, filed on Oct. 14, 2003, now Pat. No. 7,813,237.

(30) Foreign Application Priority Data

Oct. 14, 2002  (KR) .................. 10-2002-0062523

(51) Int. Cl.
*G11B 7/00* (2006.01)
(52) U.S. Cl. .................. 369/47.16; 369/47.2
(58) Field of Classification Search .............. 369/47.16, 369/47.2
See application file for complete search history.

(56) References Cited

U.S. PATENT DOCUMENTS

| | | | |
|---|---|---|---|
| 5,521,898 A | 5/1996 | Ogasawara | |
| 5,583,652 A | 12/1996 | Ware | |
| 5,602,956 A | 2/1997 | Suzuki et al. | |
| 5,630,006 A | 5/1997 | Hirayama et al. | |
| 5,691,972 A | 11/1997 | Tsuga et al. | |
| 5,703,997 A | 12/1997 | Kitamura et al. | |
| 5,734,788 A | 3/1998 | Nonomura et al. | |
| 5,742,569 A | 4/1998 | Yamamoto et al. | |
| 5,784,528 A | 7/1998 | Yamane et al. | |
| 5,884,004 A | 3/1999 | Sato et al. | |
| 5,917,781 A | 6/1999 | Kim | |
| 5,923,869 A | 7/1999 | Kashiwagi et al. | |
| 5,933,410 A | 8/1999 | Nakane et al. | |
| 5,953,290 A | 9/1999 | Fukuda et al. | |
| 5,999,694 A | 12/1999 | Yasuda et al. | |
| 5,999,698 A | 12/1999 | Nakai et al. | |
| 6,009,234 A | 12/1999 | Taira et al. | |
| 6,014,495 A | 1/2000 | Moriyama et al. | |
| 6,023,731 A * | 2/2000 | Chawla .................. | 709/231 |

(Continued)

FOREIGN PATENT DOCUMENTS

CN  1205793  1/1993
(Continued)

*Primary Examiner* — Lixi Chow
(74) *Attorney, Agent, or Firm* — Birch, Stewart, Kolasch & Birch, LLP

(57) ABSTRACT

A recording medium having a data structure for managing reproduction of multiple audio streams is discussed. The recording medium according to an embodiment includes a data area storing at least multiple audio streams in at least one portion thereof, the multiple audio streams being multiplexed, each audio stream being a transport stream and stored as one or more packets, each packet having a packet identifier, and the packets of a same audio stream having a same packet identifier, and a management area including management information for managing reproduction of the multiple audio streams.

10 Claims, 9 Drawing Sheets

U.S. PATENT DOCUMENTS

| | | | |
|---|---|---|---|
| 6,064,385 A | 5/2000 | Sturgeon et al. |
| 6,064,796 A | 5/2000 | Nakamura et al. |
| 6,067,400 A | 5/2000 | Saeki et al. |
| 6,084,581 A | 7/2000 | Hunt |
| 6,097,676 A | 8/2000 | Fujinami |
| 6,118,927 A | 9/2000 | Kikuchi et al. |
| 6,130,869 A | 10/2000 | Tokoro et al. |
| 6,167,189 A | 12/2000 | Taira et al. |
| 6,215,746 B1 | 4/2001 | Ando et al. |
| 6,219,488 B1 | 4/2001 | Mori et al. |
| 6,247,022 B1 | 6/2001 | Yankowski |
| 6,285,825 B1 | 9/2001 | Miwa et al. |
| 6,292,226 B1 | 9/2001 | Yamanaka et al. |
| 6,308,005 B1 | 10/2001 | Ando et al. |
| 6,321,027 B2 | 11/2001 | Honjo |
| 6,336,002 B1 | 1/2002 | Yamauchi et al. |
| 6,356,971 B1 | 3/2002 | Katz et al. |
| 6,360,055 B1 | 3/2002 | Kaneshige et al. |
| 6,373,803 B2 | 4/2002 | Ando et al. |
| 6,377,474 B1 | 4/2002 | Archambeault et al. |
| 6,377,518 B1 | 4/2002 | Auwens et al. |
| 6,377,747 B1 | 4/2002 | Murase et al. |
| 6,385,388 B1 | 5/2002 | Lewis et al. |
| 6,392,969 B1 | 5/2002 | Heo |
| 6,393,430 B1 | 5/2002 | Van Ryzin |
| 6,415,101 B1 | 7/2002 | DeCarmo et al. |
| 6,424,797 B1 | 7/2002 | Murase et al. |
| 6,532,334 B1 | 3/2003 | Kikuchi et al. |
| 6,570,837 B1 | 5/2003 | Kikuchi et al. |
| 6,580,870 B1 | 6/2003 | Kanazawa et al. |
| 6,584,277 B2 | 6/2003 | Tsumagari et al. |
| 6,615,192 B1 | 9/2003 | Tagawa et al. |
| 6,647,496 B1 | 11/2003 | Tagawa et al. |
| 6,700,839 B1 | 3/2004 | Auflick et al. |
| 6,727,421 B2 | 4/2004 | Izawa et al. |
| 6,763,345 B1 | 7/2004 | Hempleman et al. |
| 6,766,103 B2 | 7/2004 | Kim et al. |
| 6,778,761 B1 * | 8/2004 | Moriyama et al. ............ 386/326 |
| 6,782,192 B1 | 8/2004 | Tanaka et al. |
| 6,795,499 B1 | 9/2004 | Kato et al. |
| 6,798,981 B1 | 9/2004 | Yamauchi et al. |
| 6,832,293 B1 | 12/2004 | Tagawa et al. |
| 6,859,421 B2 * | 2/2005 | Sawabe et al. ............ 369/30.01 |
| 6,904,227 B1 | 6/2005 | Yamamoto et al. |
| 6,912,218 B1 | 6/2005 | Jeon |
| 6,914,863 B2 | 7/2005 | Ono |
| 6,965,727 B1 | 11/2005 | Sawabe et al. |
| 6,999,674 B1 | 2/2006 | Hamada et al. |
| 7,006,758 B1 | 2/2006 | Yamamoto et al. |
| 7,050,384 B2 | 5/2006 | Sasaki |
| 7,113,523 B1 * | 9/2006 | Kubota et al. ............ 370/535 |
| 7,113,694 B2 | 9/2006 | Kim et al. |
| 7,236,687 B2 | 6/2007 | Kato et al. |
| 2001/0014070 A1 | 8/2001 | Ando et al. |
| 2001/0026679 A1 | 10/2001 | Koshino |
| 2001/0030710 A1 | 10/2001 | Werner |
| 2001/0036358 A1 | 11/2001 | Kim et al. |
| 2001/0043790 A1 | 11/2001 | Saeki et al. |
| 2001/0053280 A1 | 12/2001 | Yamauchi et al. |
| 2002/0018416 A1 | 2/2002 | Heo |
| 2002/0041557 A1 | 4/2002 | Heo |
| 2002/0046328 A1 | 4/2002 | Okada |
| 2002/0093556 A1 | 7/2002 | Ishizawa et al. |
| 2002/0093886 A1 | 7/2002 | Ijichi et al. |
| 2002/0106196 A1 | 8/2002 | Yamauchi et al. |
| 2002/0126994 A1 | 9/2002 | Gunji et al. |
| 2002/0129036 A1 | 9/2002 | Ho Yuen Lok et al. |
| 2002/0135608 A1 | 9/2002 | Hamada et al. |
| 2002/0145702 A1 | 10/2002 | Kato et al. |
| 2002/0159368 A1 | 10/2002 | Noda et al. |
| 2002/0177914 A1 | 11/2002 | Chase |
| 2002/0180803 A1 | 12/2002 | Kaplan et al. |
| 2003/0030720 A1 * | 2/2003 | Hutchings ............ 348/14.02 |
| 2003/0035681 A1 | 2/2003 | Ho |
| 2003/0058948 A1 | 3/2003 | Kelly et al. |
| 2003/0103604 A1 | 6/2003 | Kato et al. |
| 2003/0118327 A1 | 6/2003 | Um et al. |
| 2003/0123346 A1 | 7/2003 | Ishii et al. |
| 2003/0123845 A1 | 7/2003 | Koda et al. |
| 2003/0147322 A1 | 8/2003 | Ono |
| 2003/0161615 A1 | 8/2003 | Tsumagari et al. |
| 2003/0235404 A1 | 12/2003 | Seo et al. |
| 2004/0014136 A1 | 1/2004 | Ishii et al. |
| 2004/0047588 A1 | 3/2004 | Okada et al. |
| 2004/0047591 A1 | 3/2004 | Seo et al. |
| 2004/0076402 A1 | 4/2004 | Jung et al. |
| 2004/0114908 A1 | 6/2004 | Ito |
| 2004/0156621 A1 | 8/2004 | Seo et al. |
| 2004/0208135 A1 | 10/2004 | Nakamura et al. |
| 2004/0213105 A1 | 10/2004 | Seo et al. |
| 2004/0220791 A1 | 11/2004 | Lamkin et al. |
| 2005/0019007 A1 | 1/2005 | Kato et al. |
| 2005/0025459 A1 | 2/2005 | Kato et al. |
| 2005/0036763 A1 | 2/2005 | Kato et al. |
| 2006/0013564 A1 | 1/2006 | Hamada et al. |
| 2006/0110132 A1 | 5/2006 | Takakuwa et al. |
| 2006/0222340 A1 | 10/2006 | Yamauchi et al. |

FOREIGN PATENT DOCUMENTS

| | | |
|---|---|---|
| CN | 1163673 | 10/1997 |
| CN | 1272209 | 2/1999 |
| CN | 1212427 | 3/1999 |
| CN | 1220458 | 4/1999 |
| CN | 1239574 | 12/1999 |
| CN | 1251680 | 4/2000 |
| CN | 1310445 | 8/2001 |
| CN | 1317200 | 10/2001 |
| CN | 1320926 | 11/2001 |
| CN | 1346491 | 4/2002 |
| CN | 1364387 | 8/2002 |
| CN | 1383679 | 12/2002 |
| CN | 1393872 | 1/2003 |
| CN | 1509572 | 6/2004 |
| CN | 1263345 | 9/2004 |
| CN | 1555058 | 12/2004 |
| CN | 1571055 | 1/2005 |
| CN | 1606355 | 4/2005 |
| CN | 1606356 | 4/2005 |
| CN | 1606357- | 4/2005 |
| CN | 1611071 | 4/2005 |
| EP | 0 723 216 | 7/1996 |
| EP | 0 724 264 | 7/1996 |
| EP | 0 737 009 | 10/1996 |
| EP | 0 831 647 | 3/1998 |
| EP | 0 836 183 | 4/1998 |
| EP | 0 836 189 | 4/1998 |
| EP | 0 858 073 A1 | 8/1998 |
| EP | 0 872 839 | 10/1998 |
| EP | 0 949 622 | 10/1999 |
| EP | 1 024 494 A2 | 8/2000 |
| EP | 1 050 880 | 11/2000 |
| EP | 1 103 974 | 5/2001 |
| EP | 1 126 454 | 8/2001 |
| EP | 1 041 565 | 9/2001 |
| EP | 1 041 569 | 1/2002 |
| EP | 1 198 132 | 4/2002 |
| EP | 1 198 133 | 4/2002 |
| EP | 1 205 933 | 5/2002 |
| EP | 1 271 526 | 1/2003 |
| EP | 1 280 348 | 1/2003 |
| EP | 1 391 119 | 2/2004 |
| EP | 1 398 965 A1 | 3/2004 |
| EP | 1 148 503 A1 | 10/2004 |
| EP | 1 468 677 A1 | 10/2004 |
| JP | 8-273304 | 10/1996 |
| JP | 09-135421 | 5/1997 |
| JP | 10-032780 | 2/1998 |
| JP | 10-040667 | 2/1998 |
| JP | 2000-195235 | 3/1998 |
| JP | 11-069308 | 3/1999 |
| JP | 11-69309 | 3/1999 |
| JP | 11-96653 | 4/1999 |
| JP | 11-110917 | 4/1999 |
| JP | 11-120747 | 4/1999 |
| JP | 11-161663 | 6/1999 |
| JP | 11-213522 | 8/1999 |

| | | | | | | |
|---|---|---|---|---|---|---|
| JP | 11-213627 | 8/1999 | | KR | 10-0300986 | 11/1999 |
| JP | 11-259985 | 9/1999 | | KR | 1999-0079482 | 11/1999 |
| JP | 1999-296997 | 10/1999 | | KR | 2000-0053633 | 8/2000 |
| JP | 2000-21130 | 1/2000 | | KR | 2001-0022702 | 3/2001 |
| JP | 2000-067522 | 3/2000 | | KR | 2001-0028735 | 4/2001 |
| JP | 2000-149405 | 5/2000 | | KR | 2001-0051898 | 6/2001 |
| JP | 2000-165361 | 6/2000 | | KR | 2001-0098007 | 11/2001 |
| JP | 2000-222822 | 8/2000 | | KR | 2001-0107578 | 12/2001 |
| JP | 2000-235779 | 8/2000 | | KR | 2002-0006273 | 1/2002 |
| JP | 2000-235780 | 8/2000 | | KR | 2002-0020919 | 3/2002 |
| JP | 12-331466 | 11/2000 | | KR | 2002-0097454 | 12/2002 |
| JP | 2000-322827 | 11/2000 | | KR | 2002-0097455 | 12/2002 |
| JP | 2000-348442 | 12/2000 | | WO | WO 97/14151 | 10/1996 |
| JP | 2001-024985 | 1/2001 | | WO | WO 97/13366 | 4/1997 |
| JP | 2001-157145 | 6/2001 | | WO | WO 97/15924 | 5/1997 |
| JP | 2001-157208 | 6/2001 | | WO | WO 97/37491 | 10/1997 |
| JP | 2001-169246 | 6/2001 | | WO | WO 97/38527 | 10/1997 |
| JP | 3199243 | 6/2001 | | WO | WO 97/39451 | 10/1997 |
| JP | 3199711 | 6/2001 | | WO | WO 99/08281 | 2/1999 |
| JP | 2001-332006 | 11/2001 | | WO | WO 97/39451 | 3/1999 |
| JP | 2002-025231 | 1/2002 | | WO | WO 99/38169 | 7/1999 |
| JP | 2002-082838 | 3/2002 | | WO | WO 00/60597 | 10/2000 |
| JP | 2002-083486 | 3/2002 | | WO | WO 01/52554 A1 | 7/2001 |
| JP | 2002-112201 | 4/2002 | | WO | WO 01/82604 | 11/2001 |
| JP | 2002-150685 | 5/2002 | | WO | WO 01/82606 | 11/2001 |
| JP | 2002-158972 | 5/2002 | | WO | WO 01/82610 | 11/2001 |
| JP | 2002-158974 | 5/2002 | | WO | WO 02/075739 | 9/2002 |
| JP | 2002-222581 | 8/2002 | | WO | WO 02/080541 A1 | 10/2002 |
| JP | 3392838 | 1/2003 | | WO | WO 03/047261 A1 | 6/2003 |
| JP | 3392849 | 1/2003 | | WO | WO 03/058957 | 7/2003 |
| JP | 2003-199047 | 7/2003 | | WO | WO 2004/001728 | 12/2003 |
| JP | 2003-520514 | 7/2003 | | WO | WO 2004/001750 | 12/2003 |
| JP | 3379961 | 12/2003 | | WO | WO 2004/001752 | 12/2003 |
| JP | 2004-127397 | 4/2004 | | WO | WO 2004/001753 | 12/2003 |
| JP | 2005-513936 | 5/2005 | | WO | WO 2004/001754 | 12/2003 |
| KR | 1996-38743 | 11/1996 | | WO | WO 2004/032142 | 4/2004 |
| KR | 1996-38744 | 11/1996 | | WO | WO 2004/047100 | 6/2004 |
| KR | 1996-38901 | 11/1996 | | WO | WO 2004/088661 | 10/2004 |
| KR | 1996-38905 | 11/1996 | | | | |
| KR | 1999-0022858 | 3/1999 | | | | |

\* cited by examiner

*DVD-ROM*

*Structure of Audio pack*

*Structure of Audio pack*

*Video Title Set Information (VTSI)*

*Video Title Set Audio Strean Attribute (VTS_AST_ATR)*

FIG. 8

*ProgramInfo-Syntax*

```
ProgramInfo(){
    length
    reserved_for_word_align
    number_of_program_sequences
    for(i=0; i<number_of_program_sequence;i++){
        SPN_program_sequence_start[i]
        program_map_PID[i]
        - - - -
        audio_PID[i][stream_index]
        audioCodingInfo(i, stream_index)
    }
    - - - -
```

RECORDING MEDIUM HAVING DATA STRUCTURE FOR MANAGING REPRODUCTION OF MULTIPLE AUDIO STREAMS RECORDED THEREON AND RECORDING AND REPRODUCING METHODS AND APPARATUSES

CROSS-REFERENCE TO RELATED APPLICATIONS

This application is a divisional of U.S. patent application Ser. No. 10/682,886 filed Oct. 14, 2003 (now allowed), now U.S. Pat. No. 7,813,237, which claims priority under 35 U.S.C. §119 on Korean Application No. 2002-062523 filed Oct. 14, 2002; the contents of the above-cited applications are incorporated by reference in their entirety.

BACKGROUND OF THE INVENTION

1. Field of the Invention

The present invention relates to a recording medium having a data structure for managing reproduction of at least multiple audio streams recorded thereon as well as methods and apparatuses for reproduction and recording.

2. Description of the Related Art

An optical disc such as a DVD (Digital Versatile Disc), capable of recording high quality video and audio data for many hours, is being developed and released to consumer markets. Various types of DVD exist including DVD-ROM and DVD-RW (DVD-Rewritable).

Video and audio streams in a DVD-ROM are recorded in units of a program stream packet defined by the MPEG standard. As shown in FIG. 1, one pack corresponds to a single physical sector with the record size of 2048 bytes.

A single pack is composed of a pack header and includes packets of video, audio, and sub-pictures. The pack header includes pack start code (Pack_start_code), SCR, program mux rate (program_mux_rate), and stuffing length (Stuffing_length).

In a DVD-ROM where a single physical sector corresponds to a single pack in the above-described manner, multiple audio streams may be recorded in a number of respective coding formats in a data area of the DVD-ROM.

For example, as shown in FIG. 2, an audio pack where audio data are recorded according to LPCM (Linear Pulse Code Modulation) format comprises a pack header (Pack_header) of 14 bytes, a packet header (Packet_header) of more than one byte, sub-stream ID (sub_stream_id) of one byte, audio frame information (Audio_frame_information), audio data information (Audio_data_information), and PCM audio data ranging from one byte to 2013 bytes.

As shown in FIG. 3, in case of an audio pack where audio data are recorded according to Dolby AC-3 format, the audio pack comprises a pack header (Pack_header) of 14 bytes, a packet header (Packet_header) of more than one byte, audio frame information (Audio_frame_information), sub-stream ID (sub_stream_id) of one byte, audio frame information (Audio_frame_information), and Dolby AC-3 audio data ranging from one byte to 2016 bytes.

As described above, an audio pack which includes audio data recorded according to a particular coding format is recorded with a characteristic sub-stream ID (sub_stream_ID) so as to determine the coding format. At the same time, attribute information corresponding to the sub-stream ID is recorded and managed in the DVD-ROM as navigation information.

For example, as shown in FIG. 4, among navigation information recorded and managed in the DVD-ROM, VTS_AST_ATR (Video Title Set Audio Stream Attribute) information is included and recorded in a VTSI (Video Title Set Information) area. The VTS_AST_ATR includes eight VTS_AST_ATRs, namely, VTS_AST_ATRs of audio streams #0 ~#7, corresponding to the respective sub-stream IDs.

The attribute information, as shown in FIG. 5, includes audio coding mode information, and the audio coding mode information includes information to identify the coding format of the audio data recorded in the corresponding audio pack.

For example, when the audio coding information corresponds to '000b', it indicates that the corresponding audio data have been encoded according to Dolby AC-3 format. Audio coding information of '010b' denotes encoding according to the MPEG-1 or MPEG-2 format without an extension bitstream, while '011b' denotes that the corresponding audio data have been encoded according to the MPEG-1 or MPEG-2 format with an extension bitstream. In addition, audio coding mode information of '100b' indicates that the corresponding audio data have been encoded according to LPCM format. An optical disc apparatus such as a DVD-player, when reading out audio data recorded in the DVD-ROM, refers to a characteristic sub-stream ID included in an audio pack and on this basis selects the audio stream requested for playback by the user.

Subsequently, the optical disc apparatus checks the audio coding mode information corresponding to the sub-stream ID of the selected audio stream and decodes the selected audio stream according to the coding format designated by the audio coding mode information. Therefore, the optical disc apparatus can normally perform selective play of an arbitrary audio stream requested by the user.

Recently, standardization of high-density optical discs such as a read-only Blu-ray disc (BD-ROM), which has a higher recording capacity than a DVD, is underway. However, an appropriate method for managing multiple audio streams for the high-density optical disc has not been established.

SUMMARY OF THE INVENTION

The recording medium according to the present invention includes a data structure for managing reproduction of at least multiple audio streams recorded on the recording medium.

In one exemplary embodiment, a data area of the recording medium stores at least multiple audio streams in at least one portion thereof, the multiple audio streams being multiplexed. Each audio stream is a transport stream and stored as one or more packets. Each packet has a packet identifier, and the packets of a same audio stream have a same packet identifier. In one exemplary embodiment, at least one of the multiple audio streams is associated with a language.

According to another exemplary embodiment of the present invention, the recording medium includes a clip information file area having at least one clip information file stored therein. The clip information file includes management information for reproducing multiple audio streams recorded on the recording medium. For example, the multiple audio streams are recorded as transport packets, and each transport packet in a same audio stream has a same packet identifier. The management information identifies each of the multiple audio streams based on the associated packet identifier. As another example, the management information indicates the coding information for each audio stream.

According to another exemplary embodiment of the present invention, the recording medium includes a management area having at least one program information field stored therein. Each program information field includes one or more program sequences. Each program sequence is associated with a different segment of at least an audio presentation and includes management information for managing reproduction of at least one audio stream in the associated segment. At least one of the program sequences includes management information for multiple audio streams in the associated segment.

According to another embodiment of the present invention, a recording medium includes a data area storing at least multiple audio streams in at least one portion thereof, the multiple audio streams being multiplexed, each audio stream being a transport stream and stored as one or more packets, each packet having a packet identifier, and the packets of a same audio stream having a same packet identifier and a management area including management information for managing reproduction of the multiple audio streams.

According to another embodiment of the present invention, a method of reproducing a data structure for managing reproduction of multiple audio streams from a recording medium includes reproducing at least multiple audio streams in a portion of the recording medium in which the multiple audio streams are multiplexed, each audio stream being a transport stream and stored as one or more transport packets, each transport packet having a packet identifier, and the transport packets of a same audio stream having a same packet identifier, and reproducing management information for managing reproduction of the multiple audio streams from a portion of the recording medium in which the management information is stored, the management information including the packet identifier for each of the multiple audio streams and coding format information for each of the multiple audio streams.

According to another embodiment of the present invention, a recording medium includes an optical reproducing device configured to reproduce data recorded on the recording medium, and a controller configured to control the optical reproducing device to reproduce at least multiple audio streams from a portion of the recording medium in which the multiple audio streams are multiplexed, each audio stream being a transport stream and stored as one or more packets, each packet having a packet identifier, and the packets of a same audio stream having a same packet identifier, and to control the optical reproducing device to reproduce management information for managing reproduction of the multiple audio streams from a portion of the recording medium in which the management information is stored, the management information including the packet identifier for each of the multiple audio streams and coding format information for each of the multiple audio streams.

According to another embodiment of the present invention, a method of recording a data structure for managing reproduction of multiple audio streams from a recording medium includes recording at least multiple audio streams in a portion of the recording medium such that the multiple audio streams are multiplexed, each audio stream being a transport stream and recorded as one or more transport packets, each transport packet having a packet identifier, and the transport packets of a same audio stream having a same packet identifier, and recording management information for managing reproduction of the multiple audio streams in another portion of the recording medium, the management information including the packet identifier for each of the multiple audio streams and coding format information for each of the multiple audio streams.

According to another embodiment of the present invention, a recording medium includes an encoder configured to encode at least multiple production path video data, and a controller configured to control the optical recording device to recording at least multiple audio streams in a portion of the recording medium such that the multiple audio streams are multiplexed, each audio stream being a transport stream and recorded as one or more packets, each packet having a packet identifier, and the packets of a same audio stream having a same packet identifier, and to control the optical recording device to record management information for managing reproduction of the multiple audio streams in another portion of the recording medium, the management information including the packet identifier for each of the multiple audio streams and coding format information for each of the multiple audio streams.

The present invention further provides apparatuses and methods for recording and reproducing the data structure according to the present invention, and recording and reproducing multiple audio streams according to the present invention.

BRIEF DESCRIPTION OF THE DRAWINGS

The above features and other advantages of the present invention will be more clearly understood from the following detailed description taken in conjunction with the accompanying drawings, in which:

FIG. 8 illustrates portions of the structure of a program information field recorded on an optical disc according to an embodiment of the present invention;

DESCRIPTION OF THE PREFERRED EMBODIMENTS

Figure 1:
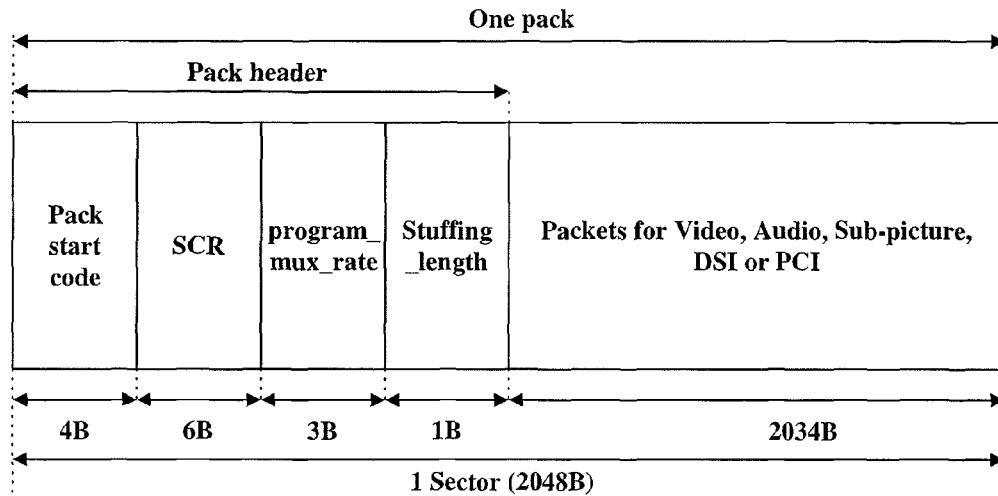
FIG. 1 is a diagram illustrating the data pack structure of DVD-ROM.
Figure 2:
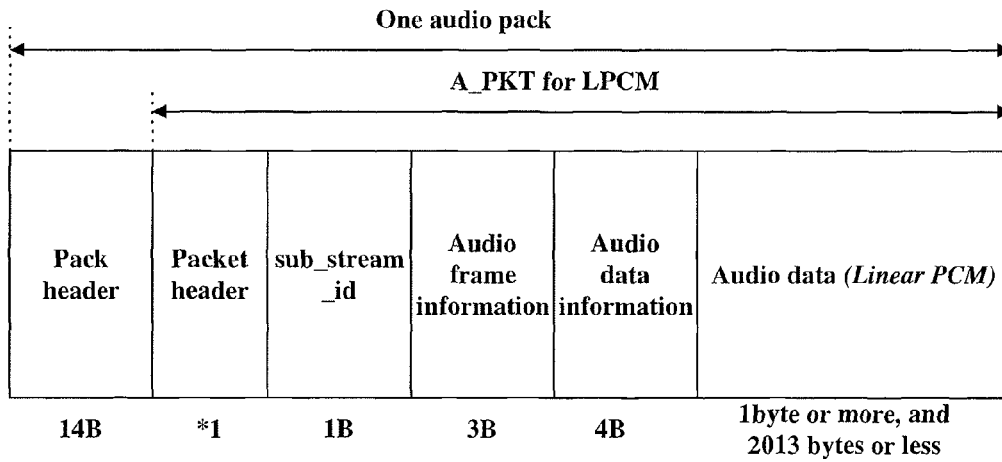
FIG. 2 is a diagram illustrating the LPCM audio pack of DVD-ROM.
Figure 3:
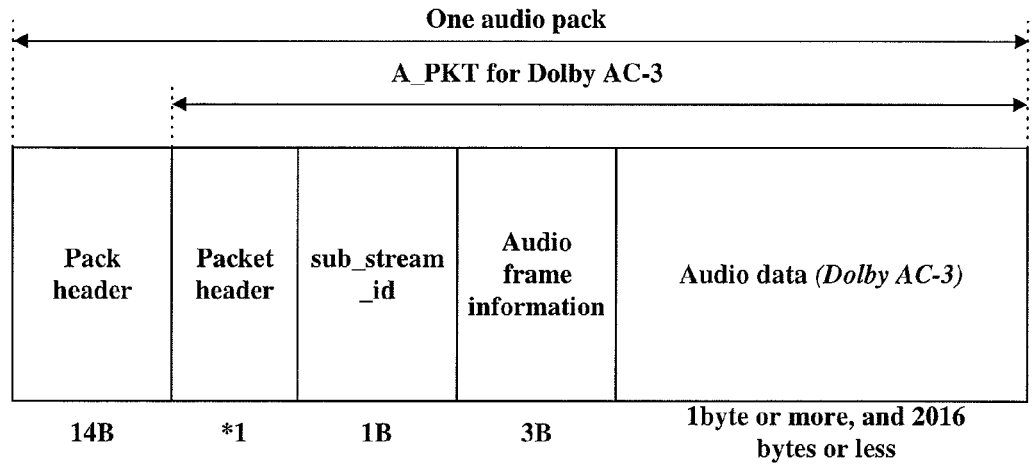
FIG. 3 is a diagram illustrating the Dolby AC-3 audio pack of DVD-ROM.
Figure 4:
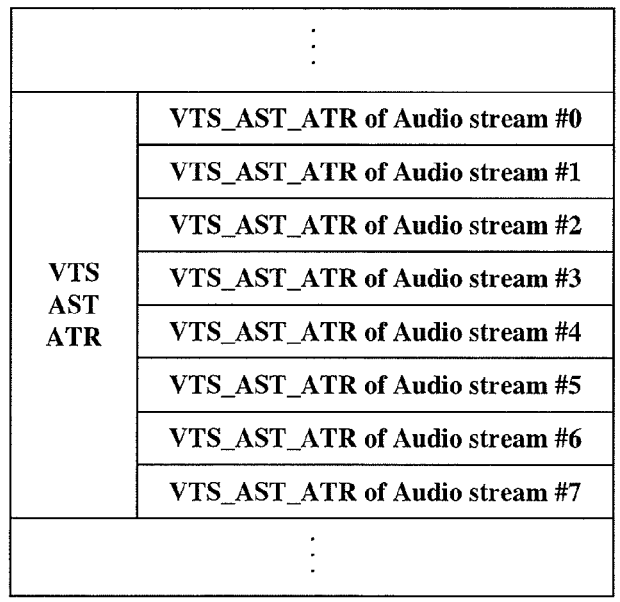
FIG. 4 is a diagram illustrating the structure of VTSI (Video Title Set Information) of DVD-ROM.
Figure 5:
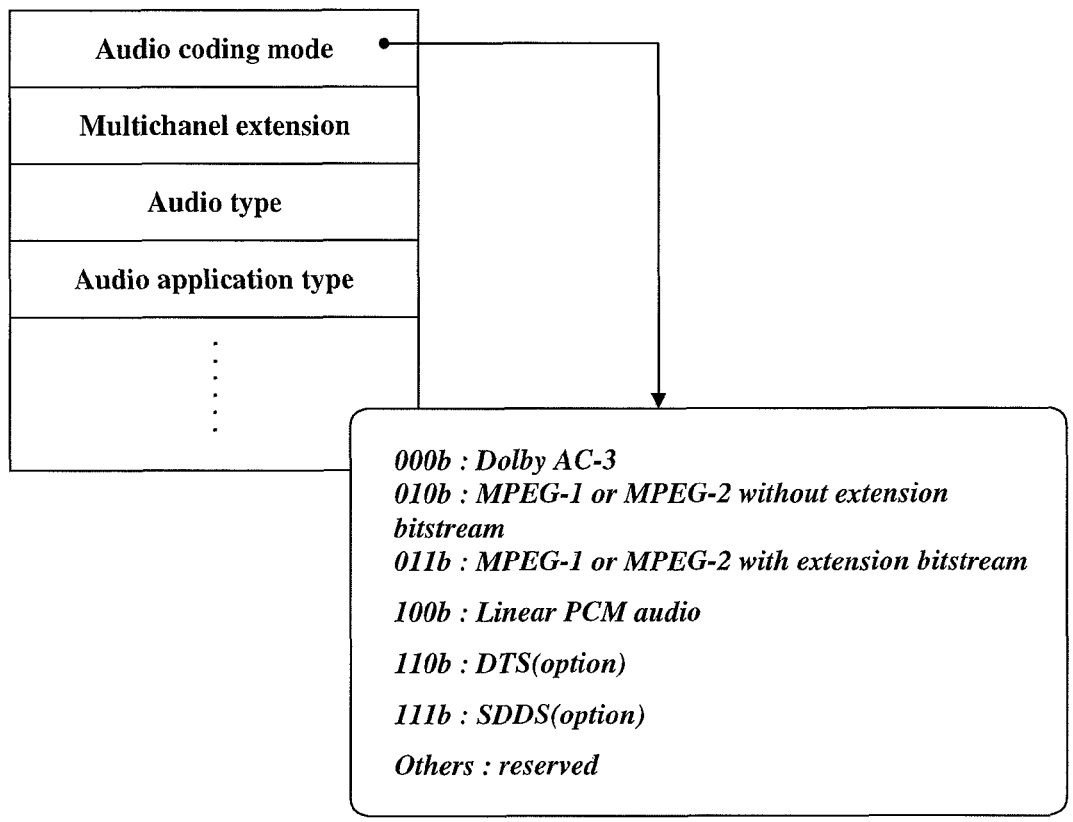
FIG. 5 is a diagram illustrating the structure of VTS_AS-T_ATR (Video Title Set Audio Stream Attribute) information of DVD-ROM.
Figure 6:
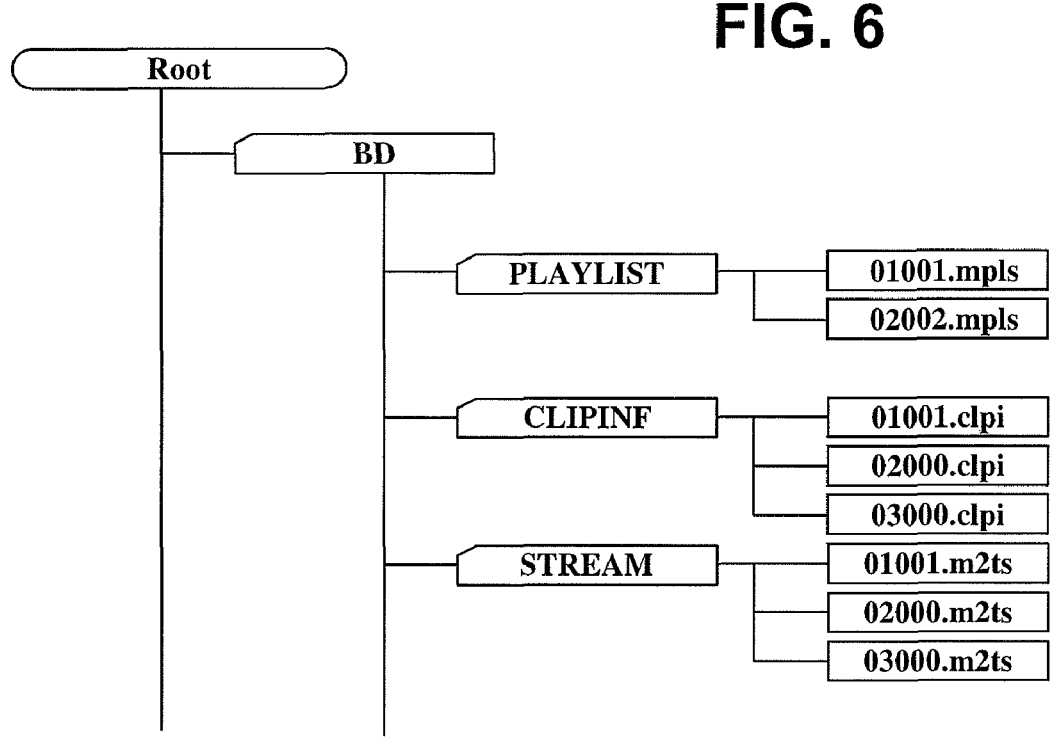
FIG. 6 illustrates an exemplary embodiment of a recording medium file or data structure according to the present invention.

A high-density optical disk, for example, a Blu-Ray ROM (BD-ROM), BD-RE, etc. in accordance with the invention may have a file or data structure for managing reproduction of video and audio data as shown in FIG. 6.

As shown in FIG. 6, the root directory contains at least one BD directory. The BD directory includes general files (not shown), a PLAYLIST directory in which playlist files (e.g., *.mpls) are stored, a CLIPINF directory in which clip information files (*.clpi) are stored, and a STREAM directory in which MPEG2-formatted A/V stream clip files (*.m2ts), corresponding to the clip information files, are stored.

The STREAM directory includes MPEG2-formatted A/V stream files called clips or clip files. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID).

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number). The presentation time stamp (PTS) and the source packet number (SPN) are related to an entry point in the A/V stream; namely, the PTS and its related SPN point to an entry point on the A/V stream. The packet pointed to is often referred to as the entry point packet.

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., presentation time stamps on an ATC or STC basis). Expressed another way, the playlist file identifies playitems, each playitem points to a clip or portion thereof and identifies the clip information file associated with the clip. The clip information file is used, among other things, to map the playitems to the clip of source packets.

The general information files (not shown) provide general information for managing the reproduction of the A/V streams recorded on the optical disk.

Figure 7:
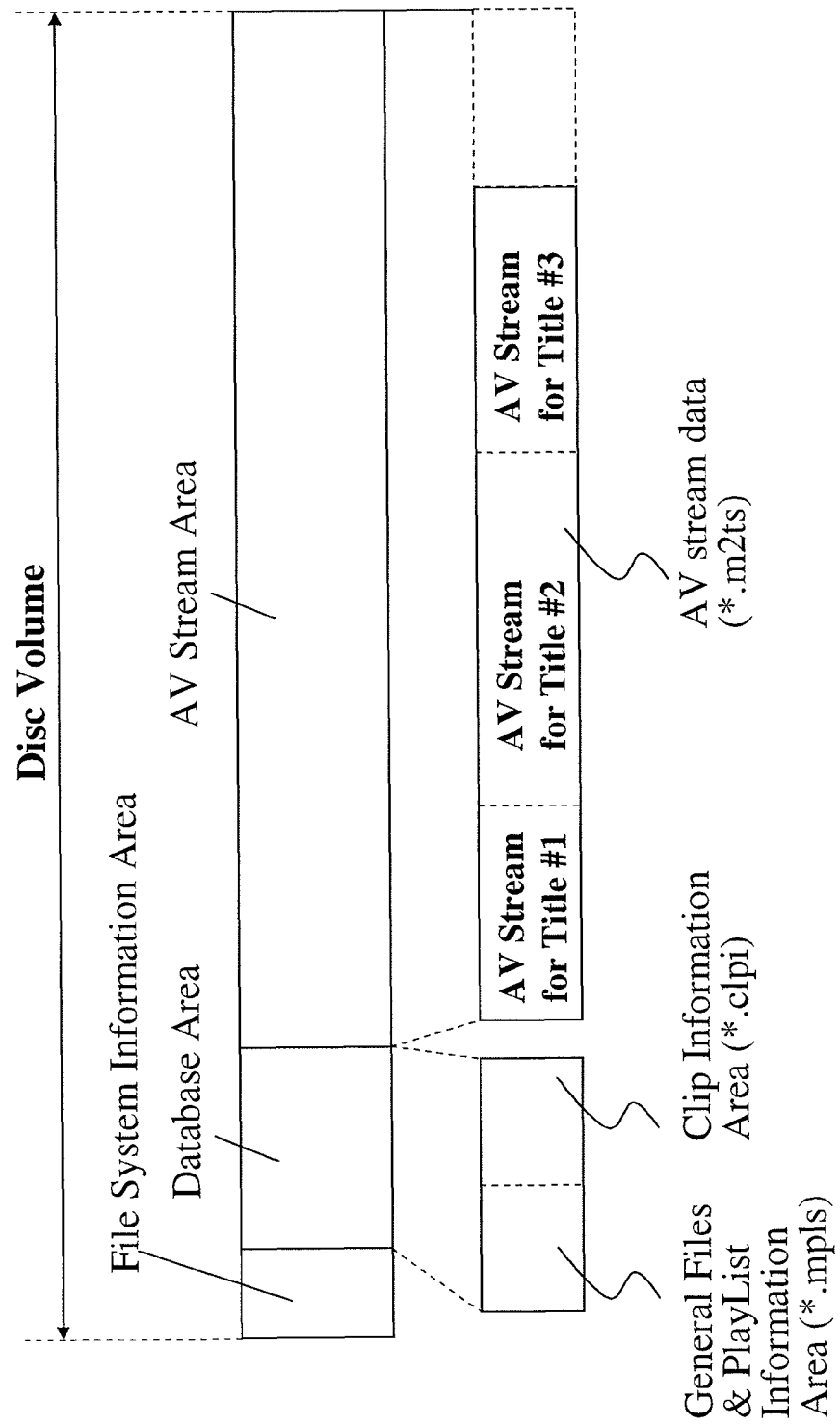
FIG. 7 illustrates an example of a recording medium having the data structure of FIG. 6 stored thereon.

In addition to illustrating the data structure of the recording medium according to an embodiment of the present invention, FIG. 6 represents the areas of the recording medium. For example, the general information files are recorded in one or more general information areas, the playlist directory is recorded in one or more playlist directory areas, each playlist in a playlist directory is recorded in one or more playlist areas of the recording medium, etc. FIG. 7 illustrates an example of a recording medium having the data structure of FIG. 6 stored thereon. As shown, the recording medium includes a file system information area, a data base area and an A/V stream area. The data base area includes a general information file and playlist information area and a clip information area. The general information file and playlist information area have the general information files recorded in a general information file area thereof, and the PLAYLIST directory and playlist files recorded in a playlist information area thereof. The clip information area has the CLIPINFO directory and associated clip information files recorded therein. The A/V stream area has the A/V streams for the various titles recorded therein.

Video and audio data are typically organized as individual titles; for example, different movies represented by the video and audio data are organized as different titles. Furthermore, a title may be organized into individual chapters in much the same way a book is often organized into chapters.

Because of the large storage capacity of the newer, high-density recording media such as BD-ROM and BD-RE optical disks, different titles, various versions of a title or portions of a title may be recorded, and therefore, reproduced from the recording media. For example, video data representing different camera angles may be recorded on the recording medium. As another example, versions of title or portions thereof associated with different languages may be recorded on the recording medium. As a still further example, a director's version and a theatrical version of a title may be recorded on the recording medium. Or, an adult version, young adult version and young child version (i.e., different parental control versions) of a title or portions of a title may be recorded on the recording medium. Each version, camera angle, etc. represents a different reproduction path, and the video data in these instances is referred to as multiple reproduction path video data. Similarly, the different audio data available (e.g., different languages, director's commentary, audio coding formats, etc.) provide different audio streams for reproduction.

The data structure for managing reproduction of multiple audio streams for a high-density optical disk in accordance with embodiments of the present invention will be described along with methods and apparatuses according to embodiments of the present invention for recording and reproducing multiple audio streams.

As discussed above, the CLIPINF directory includes a clip information file associated with each A/V stream file, and a clip information file includes a program information field. FIG. 8 illustrates portions of the structure of a program information field recorded on an optical disc according to an embodiment of the present invention. As shown, a length field indicates a length of the program information field, and a reserved_for_word_align field is reserved for future use. Next, a number of program sequences is indicated by the number_of_program_sequences field. For each program sequence i, the program information field provides at least the fields of: SPN_program_sequence_start[i], program_map_PID[i], audio_PID[i][stream_index] and audioCodingInfo(i,stream_index). The SPN_program_sequence_start[i] field indicates a source packet number of a source packet where the ith program sequence starts in the A/V stream file. The program_map_PID[i] field indicates the value of the PID of the transport packets that shall contain the program map section applicable for the ith program sequence. The audio_PID[i][stream_index] field provides the value of the PID for each audio stream in the ith program sequence, and the audioCodingInfo(i,stream_index) provides the coding information (e.g., AC3 5.1CH, LPCM 2CH, MPEG 2CH) for each audio stream in the ith program sequence. While not shown, the program information field may also provide the PID of the video streams in each program sequence.

The audio_PID field may be used in several different ways. For example, in one embodiment detailed in FIG. 9 described below, each audio stream coded in a different manner may be assigned a different audio_PID. However, the present invention is not limited to using the audio_PID field in this manner. As a further example, described in detail below with respect to FIG. 10, the audio_PID field may designate different language audio streams. As a further example, the audio_PID field could be used to differentiate an audio stream of director's commentary from one of the other above-described exemplary uses of the audio_PID field.

Figure 9:
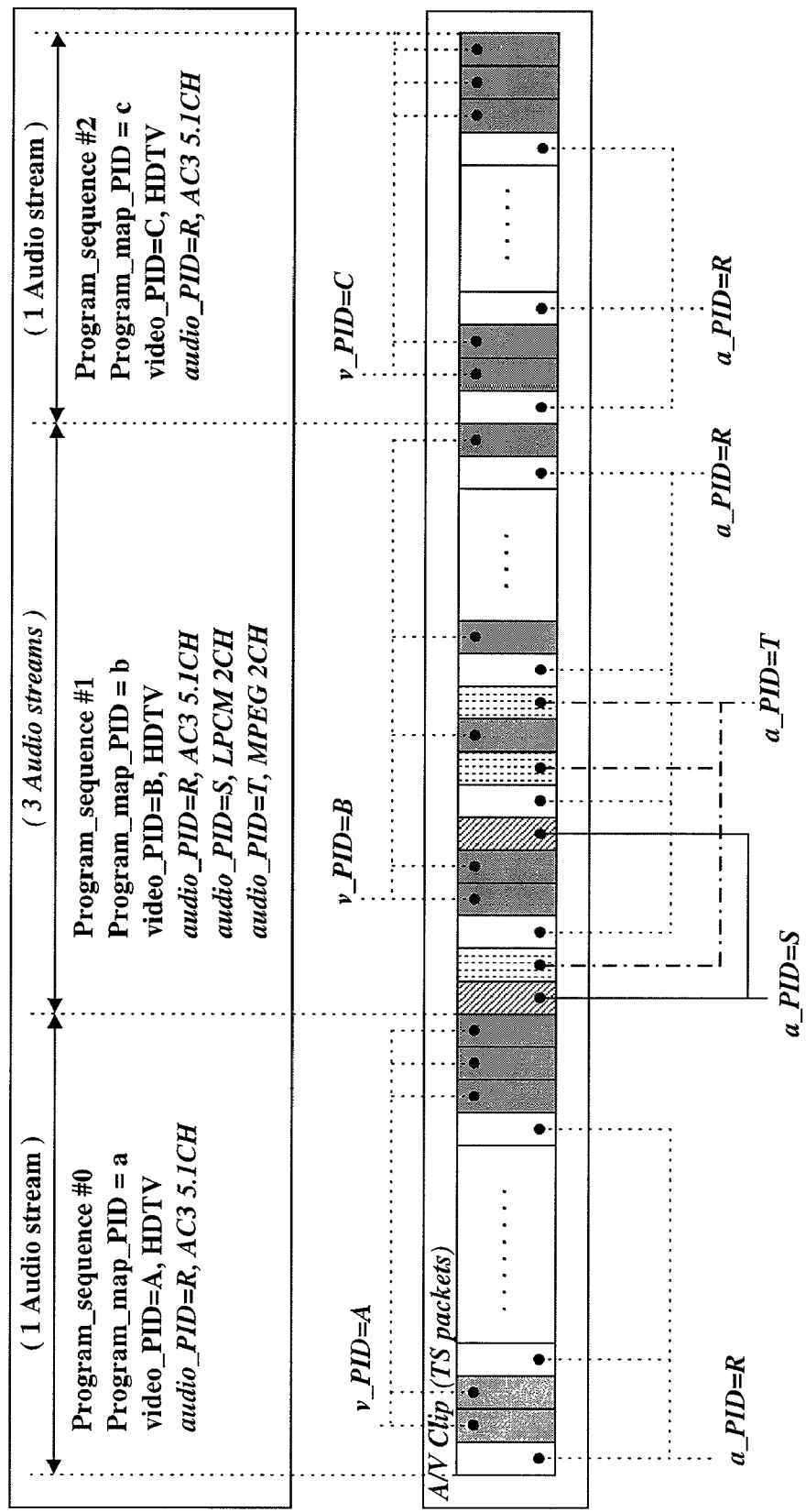
FIGS. 9 and 10 each graphically illustrates a program information field of a clip information file and an associated A/V clip recorded in a BD-ROM according to an embodiment of the present invention.
Figure 10:
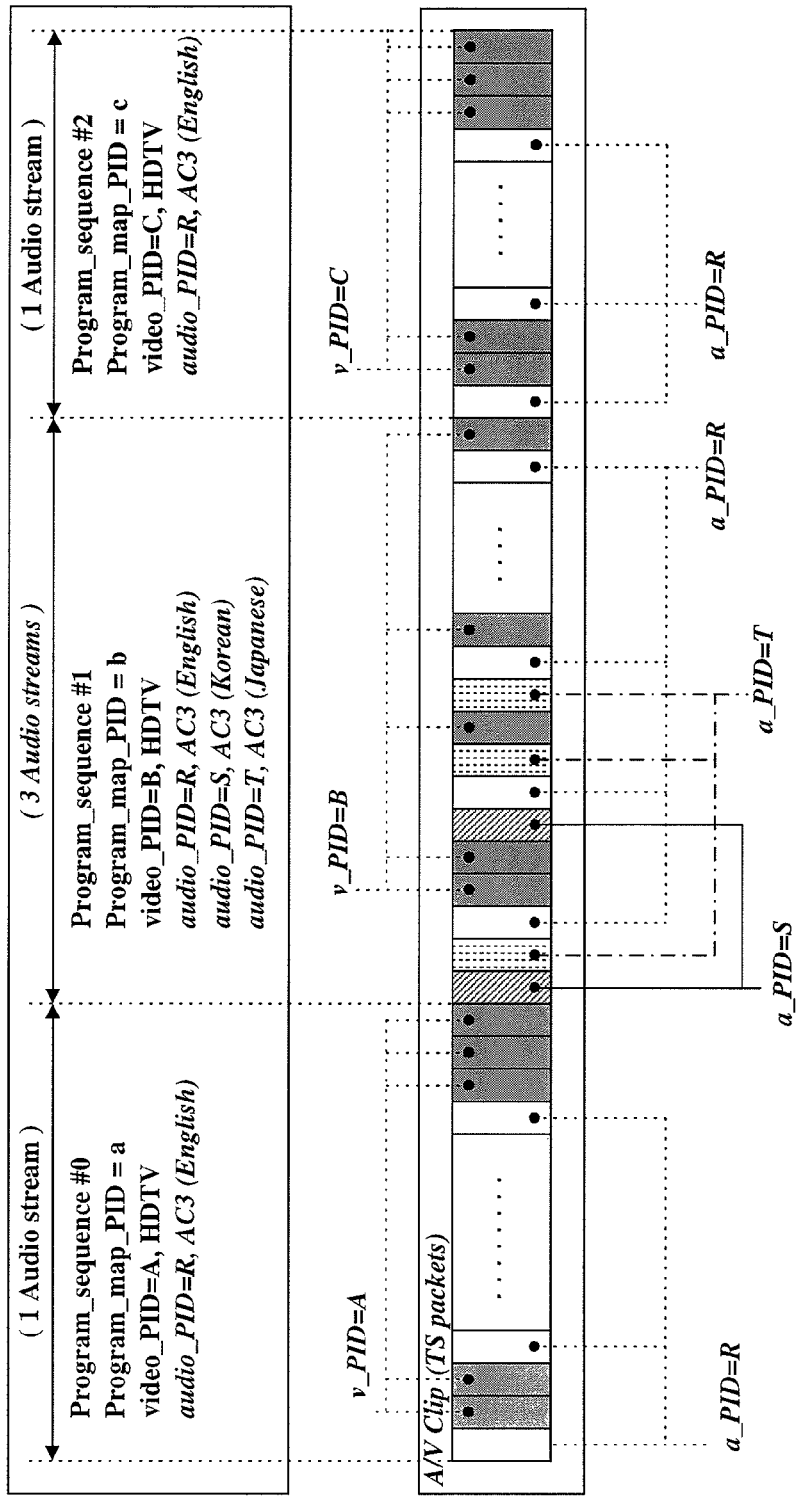

As shown in FIGS. 9 and 10, unlike the DVD-ROM standard described above, the multiple audio streams of a high-density optical disc according the present invention are divided into transport stream packets compliant with the MPEG standard, and may be recorded with video stream transport packets or recorded independently. FIG. 9 graphically illustrates a program information field of a clip information file and an associated A/V clip recorded in a BD-ROM according to an embodiment of the present invention. As shown, the program information field includes three program sequences #0, #1 and #2. The first program sequence #1 indicates the program_map_PID is 'a', the video_PID is A, HDTV and the audio_PID is 'R'. As discussed above, in this embodiment, each audio_PID indicates a particular coding format of the audio stream. Here, the audio stream having an audio_PID of 'R' indicates the audio stream is coded according to the AC3 5.1CH format. This coding information is also supplied via the audioCodingInfo field.

The second program sequence #1 indicates the program_map_PID is the video_PID is B, HDTV and that there are three audio_PIDs. This indicates that the second program sequence #1 includes three audio streams. The three audio_PID values of the three audio streams are indicated as 'R', 'S' and 'T', which respectively indicate the coding formats of AC3 5.1CH, LPCM 2CH and MPEG 2CH. This coding information is also supplied via the audioCodingInfo field.

The third program sequence #2 indicates the program_map_PID is 'c', the video_PID is C, HDTV and provides a single audio_PID of 'R'. This indicates that the third program sequence #2 includes a single audio stream. The coding information indicated by the audio_PID value is also supplied via the audioCodingInfo field.

As shown in FIG. 9 by the portion of the A/V clip file associated with the second program sequence #1, when a program sequence includes multiple audio streams, the transport packets of the multiple audio streams are multiplexed together in the A/V clip file. As further shown by this portion of the A/V clip file, the audio transport packets may also be multiplexed with the video transport packets.

As discussed above, the audio_PID of the transport packets in each audio stream of a program sequence are not limited to indicating the coding format of the audio stream, particularly, since this information is provided in the audioCodingInfo field. Instead, for example, as illustrated in FIG. 10, each audio_PID may correspond to a different language. Here, an audio stream of a particular language has its transport packets assigned the audio_PID value associated with that language. In the example of FIG. 10, the audio_PID values of 'R', 'S', and 'T' correspond to the languages English, Korean and Japanese, respectively. In addition, the audio_PID values may convey the coding format as well as the language type. And, as will be appreciated, the present invention is not limited to the audio_PID value associated with an audio stream indicating language and/or format. For example, a particular audio_PID value may indicate that the associated audio stream is director's commentary for a movie represented by an associated video stream, etc.

Figure 11:
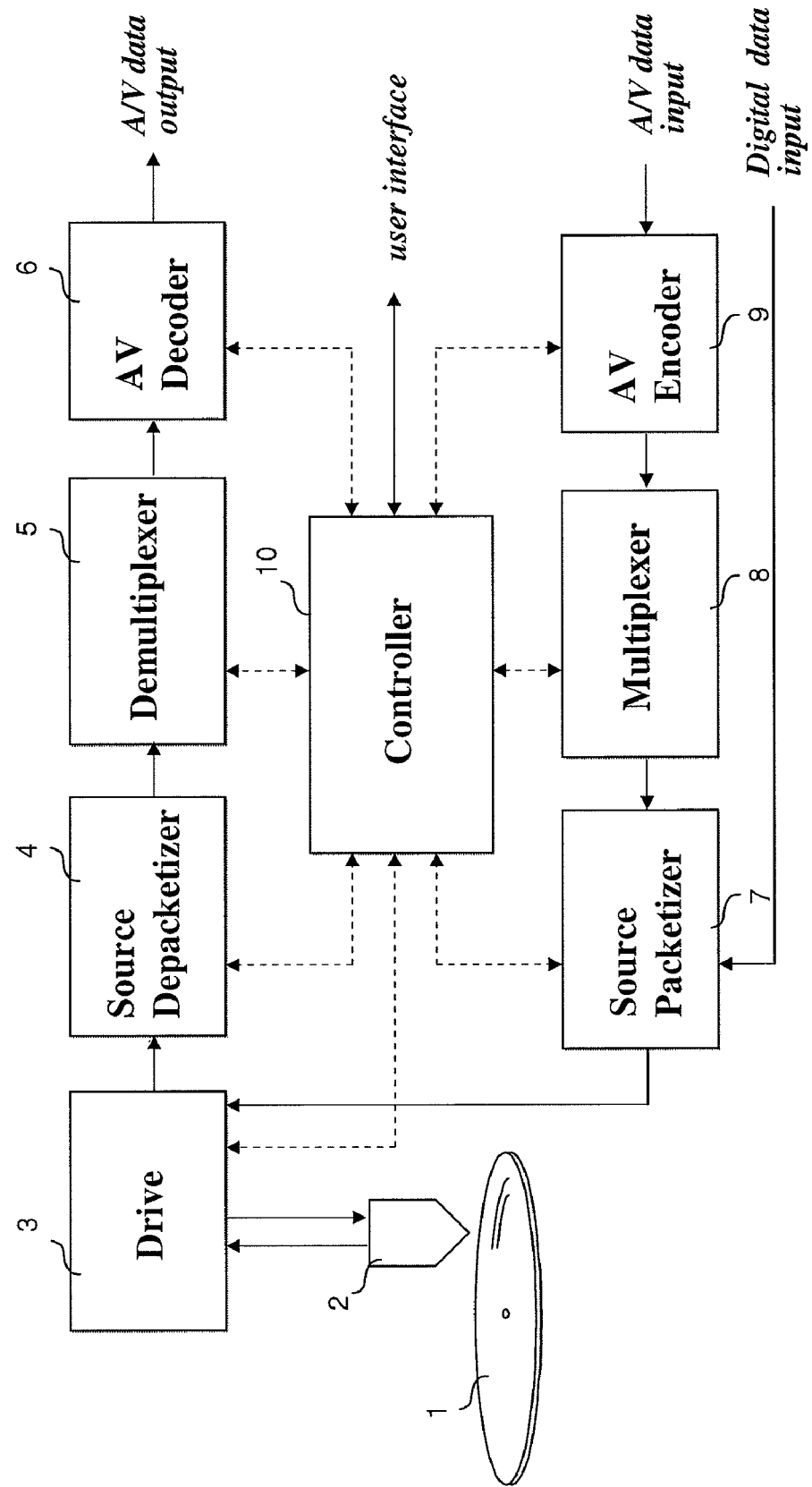
FIG. 11 is a diagram illustrating the structure of an optical disc apparatus where the present invention is applied.

FIG. 11 illustrates a schematic diagram of an embodiment of an optical disk recording and reproducing apparatus according to the present invention. As shown, an AV encoder 9 receives and encodes data (e.g., movie video and audio data, only audio data, and/or still image data). The AV encoder 9 outputs the encoded data along with coding information and stream attribute information. A multiplexer 8 multiplexes the encoded data based on the coding information and stream attribute information to create, for example, an MPEG-2 transport stream. A source packetizer 7 packetizes the transport packets from the multiplexer 8 into source packets in accordance with the audio/video format of the optical disk. As shown in FIG. 11, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the navigation and management information for managing reproduction of the data being recorded on the optical disk. For example, based on information received via the user interface (e.g., instruction set saved on disk, provided over an intranet or interne by a computer system, etc.) the controller 10 controls the drive 3 to record one or more of the data structures of FIGS. 6-10 on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce the data from the optical disk.

The reproduced source packets are received by a source depacketizer 4 and converted into a data stream (e.g., an MPEG-2 transport packet stream). A demultiplexer 5 demultiplexes the data stream into encoded data. An AV decoder 6 decodes the encoded data to produce the original data that was feed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format. When multiple audio streams are recorded in a data area of the BD-ROM, the controller 10 checks the characteristic audio packet ID (audio_PID) recorded in each audio packet.

Next, audio packets having audio packet IDs corresponding to the audio stream selected by a user via the user interface (e.g., a particular coding system, a particular language, etc.) are routed to the AV decoder 6 by the demultiplexer 5 under the control of the controller 10.

The controller 10 also searches for and checks the corresponding audio coding information (audioCodingInfo) in the program information field and instructs the decoder 6 to perform decoding operations according to the coding format designated by the audio coding information.

While FIG. 11 has been described as a recording and reproducing apparatus, it will be understood that only a recording or only a reproducing apparatus may be provided using those portions of FIG. 11 providing the recording or reproducing function.

As will be appreciated from the forgoing disclosure, the present invention provides a recording medium having a data structure for managing multiple audio streams recorded on a high-density recording medium (e.g., a high-density optical disk such as a BD-ROM).

As apparent from the above description, the present invention provides methods and apparatuses for recording a data structure on a high density recording medium for managing multiple audio streams recorded on the recording medium.

The above description further provides methods and apparatus for reproducing multiple audio streams recorded on a high density recording medium based on a data structure, also recorded on the high density recording medium, for managing the reproduction of the multiple audio streams.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. A recording medium comprising:
   at least multiple audio streams, the multiple audio streams being multiplexed, each audio stream being a transport stream and stored as one or more packets, each packet having a packet identifier, and the packets of a same audio stream having a same packet identifier;
   at least one clip information file for managing reproduction of the multiple audio streams, the at least one clip information file including a program information field, the program information field including,
   a stream PID field identifying the packet identifier,
   a coding format field identifying a coding format of the multiple audio streams, and
   a program map PID field indicating a PID of at least one of the transport packets containing a program map section associated with a program sequence; and
   at least one playlist file including at least one playitem, the playitem indicating a playing interval of the multiple audio streams.

2. The recording medium of claim 1, wherein audio streams have different packet identifiers, and each of the different packet identifiers identifies audio streams for different languages respectively.

3. A method of reproducing data from a recording medium, the method comprising:
   reading at least one playlist file including at least one playitem from the recording medium, the playitem indicating a playing interval of multiple audio streams;
   reading at least one clip information file for managing reproduction of the multiple audio streams from the recording medium, the at least one clip information file including a program information field, the program information field including,
   a stream PID field identifying a packet identifier of the multiple audio streams,
   a coding format field identifying a coding format of the multiple audio streams, and
   a program map PID field indicating a PID of at least one of the transport packets containing a program map section associated with a program sequence; and
   reproducing the multiple audio streams from a portion of the recording medium in which the multiple audio streams are multiplexed, each audio stream being a transport stream and stored as one or more packets, each packet having a packet identifier, and the packets of a same audio stream having a same packet identifier.

4. The method of claim 3, wherein audio streams have different packet identifiers, and each of the different packet identifiers identifies audio streams for different languages respectively.

5. An apparatus for reproducing data from a recording medium, the apparatus comprising:
   an optical reproducing device configured to reproduce data recorded on the recording medium; and
   a controller configured to control the optical reproducing device to:
   read at least one playlist file including at least one playitem from the recording medium, the playitem indicating a playing interval of multiple audio streams;
   read at least one clip information file for managing reproduction of the multiple audio streams, the at least one clip information file including a program information field, the program information field including,
   a stream PID field identifying a packet identifier of the multiple audio streams,
   a coding format field identifying a coding format of the multiple audio streams, and
   a program map PID field indicating a PID of at least one of the transport packets containing a program map section associated with a program sequence; and
   reproduce the multiple audio streams from a portion of the recording medium in which the multiple audio streams are multiplexed, each audio stream being a transport stream and stored as one or more packets, each packet having a packet identifier, and the packets of a same audio stream having a same packet identifier.

6. The apparatus of claim 5, wherein audio streams have different packet identifiers, and each of the different packet identifiers identifies audio streams for different languages respectively.

7. A method of recording data on a recording medium, the method comprising:
   recording at least multiple audio streams on the recording medium such that the multiple audio streams are multiplexed, each audio stream being a transport stream and recorded as one or more packets, each packet having a packet identifier, and the packets of a same audio stream having a same packet identifier;
   recording at least one clip information file for managing reproduction of the multiple audio streams on the recording medium, the at least one clip information file including a program information field, the program information field including,
   a stream PID field identifying the packet identifier,
   a coding format field identifying a coding format of the multiple audio streams, and
   a program map PID field indicating a PID of at least one of the transport packets containing a program map section associated with a program sequence; and
   recording at least one playlist file including at least one playitem on the recording medium, the playitem indicating a playing interval of the multiple audio streams.

8. The method of claim 7, wherein audio streams have different packet identifiers, and each of the different packet identifiers identifies audio streams for different languages respectively.

9. An apparatus for recording data on a recording medium, the apparatus comprising:
- an optical recording device configured to record data on the recording medium; and
- a controller configured to control the optical recording device to,
- record at least multiple audio streams in the recording medium such that the multiple audio streams are multiplexed, each audio stream being a transport stream and recorded as one or more packets, each packet having a packet identifier, and the packets of a same audio stream having a same packet identifier, and
- record at least one clip information file for managing reproduction of the multiple audio streams in the recording medium, the at least one clip information file including a program information field, the program information field including,
  - a stream PID field identifying the packet identifier,
  - a coding format field identifying a coding format of the multiple audio streams, and
  - a program map PID field indicating a PID of at least one of the transport packets containing a program map section associated with a program sequence, and
- record at least one playlist file including at least one playitem in the recording medium, the playitem indicating a playing interval of the multiple audio streams.

10. The apparatus of claim 9, wherein audio streams have different packet identifiers, and the different packet identifiers identifies audio streams for different languages respectively.

* * * * *